US012686033B2

(12) United States Patent
Liu et al.

(10) Patent No.: US 12,686,033 B2
(45) Date of Patent: Jul. 21, 2026

(54) GOODS SORTING SYSTEM, GOODS SORTING METHOD, AND STORAGE MEDIUM

(71) Applicant: BEIJING GEEKPLUS TECHNOLOGY CO., LTD., Beijing (CN)

(72) Inventors: Kai Liu, Beijing (CN); Qiufeng Lan, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/555,944

(22) PCT Filed: Apr. 12, 2022

(86) PCT No.: PCT/CN2022/086464
§ 371 (c)(1),
(2) Date: Oct. 18, 2023

(87) PCT Pub. No.: WO2022/222802
PCT Pub. Date: Oct. 27, 2022

(65) Prior Publication Data
US 2024/0198389 A1     Jun. 20, 2024

(30) Foreign Application Priority Data

Apr. 19, 2021     (CN) ........................ 202110420037.X
Apr. 19, 2021     (CN) ........................ 202120803327.8

(51) Int. Cl.
*B07C 5/36*          (2006.01)
*B65G 1/137*        (2006.01)

(52) U.S. Cl.
CPC ............ *B07C 5/361* (2013.01); *B65G 1/1378* (2013.01); *B07C 2501/0063* (2013.01)

(58) Field of Classification Search
CPC . B07C 5/361; B07C 2501/0063; B07C 3/008; B65G 1/137; B65G 1/1378; B65G 1/0492; B65G 1/065

(Continued)

(56) References Cited

U.S. PATENT DOCUMENTS

2020/0086349 A1*   3/2020   Han ........................ B07C 3/006

FOREIGN PATENT DOCUMENTS

CN          107472787          12/2017
CN          208357253          1/2019

(Continued)

OTHER PUBLICATIONS

Chen; Yuqi, "Sorting Robot and Sorting Method" (English Translation), Dec. 20, 2019, worldwide.espacenet.com (Year: 2019).*

(Continued)

*Primary Examiner* — Molly K Devine
(74) *Attorney, Agent, or Firm* — Hodgson Russ LLP

(57)          ABSTRACT

A goods sorting system includes at least one layer of operation platform, a control server, and at least one first robot operating on the operation platform. Each first robot includes at least two delivery mechanisms. Each operation platform includes at least two delivery container layers corresponding to the delivery mechanisms. Each delivery container layer includes at least one delivery container. The control server determines a target delivery container, a target delivery container layer, and a target operation platform, based on information of goods to be sorted; dispatches one first robot as a target first robot and determines one delivery mechanism as a target delivery mechanism, based on the target delivery container layer and the target operation platform; and controls the target delivery mechanism to (Continued)

Fourth delivery container layer
15
Third delivery container layer
Second delivery container layer
15
First delivery container layer
Second layer of operation platform
First layer of operation platform obtain the goods to be sorted. The first robot delivers the goods to be sorted in the target delivery mechanism into the target delivery container.

13 Claims, 4 Drawing Sheets

(58) Field of Classification Search
USPC ........................................................ 209/509
See application file for complete search history.

(56) References Cited

FOREIGN PATENT DOCUMENTS

| CN | 209177372 | 7/2019 |
| CN | 110280488 | 9/2019 |
| CN | 110482089 | 11/2019 |
| CN | 110510315 | 11/2019 |
| CN | 110589327 | 12/2019 |
| CN | 110606305 | 12/2019 |
| CN | 111589719 | 8/2020 |

| CN | 212862675 | 4/2021 | |
| CN | 112974285 | 6/2021 | |
| CN | 214638310 | 11/2021 | |
| JP | H074408 U | * 1/1995 | ............... B65G 1/00 |
| JP | H1143211 | 2/1999 | |
| JP | 2020125191 | 8/2020 | |
| WO | 2019238030 | 12/2019 | |

OTHER PUBLICATIONS

Wang; Xinhao, "Storing and Goods Sorting System and Control Method and Device for Goods Sorting" (English Translation), Sep. 27, 2019, worldwide.espacenet.com (Year: 2019).*
Tsuchida; Naruki, "Automatic Storage Retrieval Device" (English Translation), Jan. 24, 1995, worldwide.espacenet.com (Year: 1995).*
Qingguang; Ma, "Multi-Platform Article Sorting System" (English Translation), Jan. 11, 2019, worldwide.espacenet.com (Year: 2019).*
WIPO, International Search Report and Written Opinion for PCT/CN2022/086464, Jun. 27, 2022.
CNIPA, First Office Action for CN Application No. 202110420037.X, Dec. 24, 2024.

* cited by examiner

Fourth delivery container layer

Third delivery container layer

Second delivery container layer

First delivery container layer

Second layer of operation platform

First layer of operation platform

Second layer of
operation platform    First layer of
operation platform

GOODS SORTING SYSTEM, GOODS SORTING METHOD, AND STORAGE MEDIUM

CROSS-REFERENCE TO RELATED APPLICATIONS

This application is a U.S. national phase entry of International Application No. PCT/CN2022/086464, filed on Apr. 12, 2022, which claims priority to Chinese Patent Application No. 202110420037.X, filed on Apr. 19, 2021, and Chinese Patent Application No. 202120803327.8, filed on Apr. 19, 2021. The entire disclosures of the above-identified applications are incorporated herein by reference.

TECHNICAL FIELD

The present disclosure relates to the technical field of warehousing management, and in particular to a goods sorting system, a goods sorting method, and a storage medium.

BACKGROUND

With the rapid development of e-commerce, consumption needs of users for goods diversification have put forward higher requirements for the current logistics industry. The most important process is goods sorting.

In order to meet the needs of the users for diversified goods, a warehousing management center usually uses a manner for sorting goods for multiple times, such as first rough sorting and then fine sorting. However, this goods sorting manner can simultaneously achieve rough sorting and fine sorting only when it is performed in multiple sites, resulting in an increase in a site occupation area, thus increasing the rental costs of a warehouse. In addition, repeated sorting can increase the damage rate of goods to be sorted.

Therefore, in a case of a limited site area, the goods sorting efficiency and the goods sorting accuracy are improved. It is an urgent problem to be solved in the current logistics industry.

SUMMARY

In a first aspect, embodiments of the present disclosure provide a goods sorting system. The system includes at least one layer of operation platform, a control server, and at least one first robot operating on the at least one layer of operation platform. Each first robot is provided with at least two delivery mechanisms; each layer of the operation platform is provided with at least two delivery container layers, each delivery container layer is provided with at least one delivery container; the delivery container layers correspond to the delivery mechanisms;

the control server is configured to determine, on the basis of information of goods to be sorted, a target delivery container corresponding to the goods to be sorted, a target delivery container layer where the target delivery container is located, and a target operation platform; on the basis of the target delivery container layer where the target delivery container is located and the target operation platform, dispatch one of the first robots as a target first robot, and determine one of the delivery mechanisms in the target first robot as a target delivery mechanism; and control the target delivery mechanism of the target first robot to obtain the goods to be sorted; and the first robot is configured to deliver the goods to be sorted in the target delivery mechanism into the target delivery container.

In a second aspect, embodiments of the present disclosure further provide a goods sorting method, applied to the control server in the goods sorting system in the first aspect. The goods sorting system includes at least one layer of the operation platform, and at least one first robot operating on the at least one layer of operation platform. Each first robot is provided with at least two delivery mechanisms; each layer of the operation platform is provided with at least two delivery container layers, each delivery container layer is provided with at least one delivery container; the delivery container layers correspond to the delivery mechanisms; and the goods sorting method includes:

determining, on the basis of information of goods to be sorted, the target delivery container corresponding to the goods to be sorted, the target delivery container layer where the target delivery container is located, and the target operation platform; and on the basis of the target delivery container layer where the target delivery container is located and the target operation platform, dispatching one of the first robots as the target first robot, and determining one of the delivery mechanisms in the target first robot as the target delivery mechanism.

In a third aspect, embodiments of the present disclosure further provide a non-transitory computer-readable storage medium, storing computer-readable instructions. When the instructions in the storage medium are executed by a processor, the processor is configured to:

determine, on the basis of information of goods to be sorted, a target delivery container corresponding to the goods to be sorted, a target delivery container layer where a target delivery container is located, and a target operation platform; and dispatch one of at least one first robot as a target first robot, and determine one of at least two delivery mechanisms in the target first robot as a target delivery mechanism, on the basis of the target delivery container layer where the target delivery container is located and the target operation platform.

In order to make the above-mentioned objectives, features and advantages of the present disclosure more obvious and easy to understand, preferred embodiments are listed below, and are described in detail as follows in conjunction with the accompanying drawings.

BRIEF DESCRIPTION OF THE DRAWINGS

In order to more clearly explain the technical solutions of the embodiments of the present disclosure, the following will briefly introduce the drawings required to be used in the embodiments. The drawings here are incorporated into this specification and constitute a part of this specification. These drawings show the embodiments in accordance with the present disclosure, and are used together with this specification to explain the technical solutions of the present disclosure.

DETAILED DESCRIPTION

Figure 1:
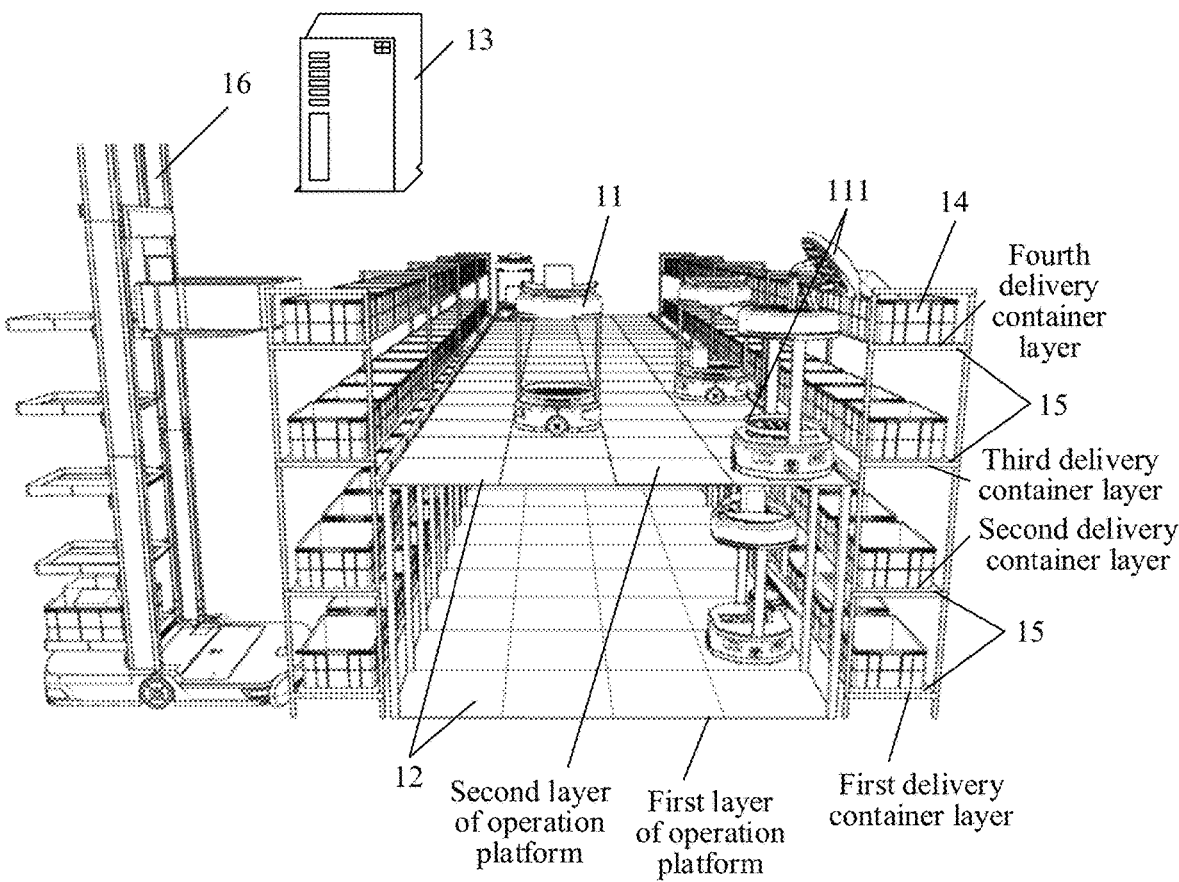
FIG. 1 shows a schematic diagram of a first robot operating on a plurality of operation platforms according to an embodiment of the present disclosure.

In order to make the objectives, technical solutions and advantages of embodiments of the present disclosure clearer, the technical solutions in the embodiments of the present disclosure will be described clearly and completely below in combination with the drawings of the embodiments of the present disclosure. Obviously, the embodiments described herein are a part of the embodiments of the present disclosure only, not all of the embodiments. Components of the embodiments of the present disclosure generally described and shown in the drawings here can be arranged and designed in a variety of different configurations. Therefore, the following detailed description for the embodiments of the present disclosure provided in the accompanying drawings is not intended to limit the scope of the claimed present disclosure, but merely represents selected embodiments of the present disclosure. Based on the embodiments in the present disclosure, all other embodiments obtained by those skilled in the art without creative work shall fall within the protection scope of the present disclosure.

In addition, the terms "first", "second", and the like in the specification and claims of the embodiments of the present disclosure and the above-mentioned drawings are used to distinguish similar objects, and are not necessarily used to describe a specific sequence or a precedence order. It should be understood that data used in this way is interchangeable under appropriate circumstances so that the embodiments described herein can be implemented in an order other than contents illustrated or described herein.

The "plurality or several" mentioned herein means two or more. "And/or" describes an association relation of associated objects, indicating that there can be three types of relations. For example, A and/or B can mean: A exists alone, A and B exist at the same time, and B exists alone. The character "/" generally indicates that the front and back related objects are in an "or" relationship.

It has been found via researches that in a traditional goods sorting method, a robot with only one delivery mechanism is used for goods delivery. It greatly reduces the delivery efficiency of the robot in a fine sorting scenario. In addition, to achieve fine sorting, existing technical means 1 is as follows: adding delivery containers for goods to be sorted. This goods sorting method can simultaneously achieve rough sorting and fine sorting only when it is performed in multiple sites, resulting in an increase in a site occupation area, thus increasing the rental costs of a warehouse. Existing technical means 2 is as follows: achieving fine sorting using a multi-sorting manner under a limited site space condition. However, repeated sorting will increase the damage rate of the goods to be sorted.

Based on the above research, the present disclosure provides a goods sorting system, a robot, and a goods sorting method. The system is provided with at least one layer of operation platform on which a first robot operates. Each layer of the operation platform is provided with the at least two delivery container layers. The delivery container layers correspond to deliver mechanisms. An area of a sorting site for the goods to be sorted can be enlarged, thereby reducing the number of times of sorting and improving the sorting efficiency. Meanwhile, an occupation area of warehousing can be reduced, and the warehousing costs are saved. As the number of layers of the operation platforms increases, the area of the sorting site for the goods to be sorted can be greatly enlarged, which can achieve one-time sorting of the goods to be sorted, namely, which can achieve fine sorting of the goods to be sorted without secondary sorting. In addition, a decrease in the number of times of sorting can effectively reduce the damage rate of the goods to be sorted in a sorting process. In addition, the first robot that transfers the goods to be sorted is provided with at least two delivery mechanisms, which also greatly shortens an average distance of the first robot for delivering the goods to be sorted and further improves the goods sorting efficiency. In addition, under the same occupation area of warehousing, each layer of the operation platform is provided with the at least two delivery container layers, each delivery container layer is provided with at least one delivery container, and the delivery container layers correspond to the delivery mechanisms. The number of delivery containers that receive the goods to be sorted can also be increased by N times ($N=M\times R$, where M represents the number of layers of the operation platforms, and R represents a quantity of the delivery mechanisms), so that the number of times of sorting is further reduced, and the sorting efficiency is improved.

In view of the defects in the above solutions, they are all results obtained by the inventor through practice and careful study. Therefore, the discovery process of the above problems and the solutions proposed by the present disclosure below for the above problems should be contributions made by the inventor to the present disclosure in the process of the present disclosure.

It should be noted that similar reference signs and letters indicate similar terms in the following drawings. Therefore, once a certain term is defined in one drawing, it is unnecessary to be further defined and explained in the subsequent drawings.

To facilitate the understanding of this embodiment, an application scenario of a goods box transferring system disclosed in the embodiments of the present disclosure is first introduced. The goods box transferring system provided in the embodiments of the present disclosure can be applied to a scenario where the first robot delivers the goods to be sorted on a plurality of the operation platforms. FIG. 1 shows a schematic diagram of a first robot operating on a plurality of operation platforms.

In one embodiment, each layer of the operation platforms may be provided with at least one first robot 11. In this case, these first robots 11 complete a delivery task only in the corresponding operation platforms 12. Each of the first robots 11 may separately deliver the goods to be sorted on two delivery mechanisms 111 into different delivery containers 14 in response to a move instruction sent by a control server 13, which can greatly shorten an average distance of the first robot for delivering the goods to be sorted and further improve the goods sorting efficiency.

In another embodiment, at least one first robot 11 obtains the goods to be sorted at a unified item supply mechanism and delivers the goods to be sorted into the delivery containers 14 corresponding to the operation platforms 12 on different layers. It should be noted that the item supply mechanism here can be arranged on any layer of the operation platform. Or, the item supply mechanism can be arranged outside the operation platform. The delivery process is the same as that of the previous embodiment, and repetitions will be omitted.

When the delivery container 14 is full of goods, a second robot 16 may also be used to replace the delivery container 14 that is full of the goods to be sorted with an empty delivery container. Or, a transferring device such as a mechanical arm may be used to replace the delivery container 14 that is full of the goods to be sorted with an empty delivery container. Replacement mechanisms can be arranged according to specific implementation scenarios, which will not be limited here.

Figure 2:
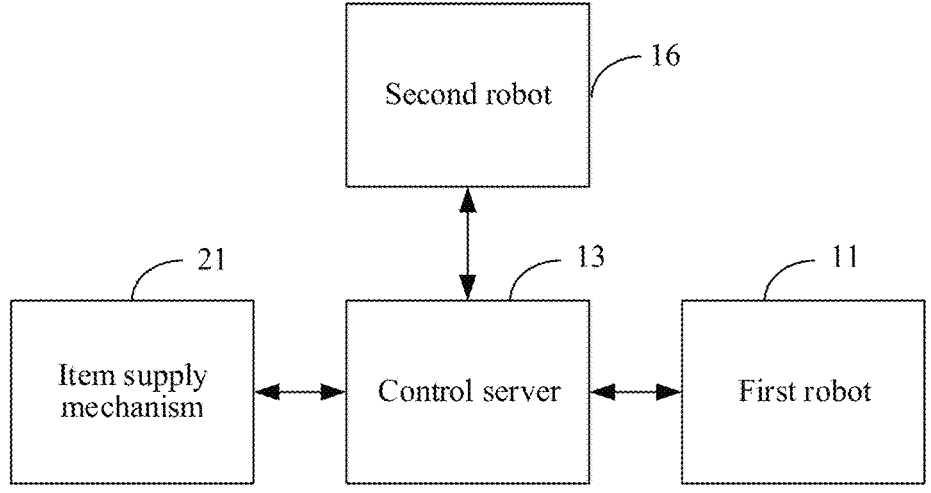
FIG. 2 shows a schematic diagram of a goods sorting system according to an embodiment of the present disclosure.

Based on the above scenario, a goods sorting system according to an embodiment of the present disclosure will be described in detail below:

FIG. 2 shows a schematic diagram of a goods sorting system according to an embodiment of the present disclosure. The system includes at least one layer of the operation platform on which the first robot operates, a control server 13, and at least one first robot 11. The first robot 11 is provided with at least two delivery mechanisms 111 (as shown in FIG. 1); each layer of the operation platform is provided with at least two delivery container layers 15 (as shown in FIG. 1), each delivery container layer 15 is provided with at least one delivery container 14 (as shown in FIG. 1); and the delivery container layers 15 correspond to the delivery mechanisms 111.

The control server 13 is configured to determine, on the basis of information of goods to be sorted, a target delivery container corresponding to the goods to be sorted, a target delivery container layer where the target delivery container is located, and a target operation platform; on the basis of the target delivery container layer where the target delivery container is located and the target operation platform, dispatch one of the first robots as a target first robot, and determine one of the delivery mechanisms in the target first robot as a target delivery mechanism; and control the target delivery mechanism of the target first robot to obtain the goods to be sorted.

The first robot 11 is configured to deliver the goods to be sorted in the target delivery mechanism into the target delivery container.

In some embodiments, the control server stores location information of each piece of goods to be sorted delivered into a delivery container on a delivery container layer, so that location information of the target delivery container can be determined in a case that the information of goods to be sorted is known.

Specifically, the control server may store a sorting map corresponding to each layer of the operation platform, and may determine, on the basis of the information of goods to be sorted, the target delivery container corresponding to the goods to be sorted and the location information of the target delivery container, namely, three-dimensional coordinates (x, y, z) on the sorting map, where (x, y) in the three-dimensional coordinates are used to indicate two-dimensional coordinates of the target delivery container, and z is used to indicate the target delivery container layer where the target delivery container is located and the target operation platform. In a case that the operation platforms are provided with the first robots, the target first robot can be determined according to the target operation platform indicated by z. Or, in a case that the first robots can move across the platforms, the target first robot can be determined first. Since the delivery container layers correspond to the delivery mechanisms, the target delivery mechanism of the target first robot can be determined according to the target delivery container layer indicated by z where the target delivery container is located, and then the target first robot can run to the target operation platform indicated by z for delivery.

In one possible implementation, the at least one layer of the operation platform 12 of the first robot may include the ground, and operation surfaces of the first robot 11 on the different operation platforms 12 are parallel with the ground and vertically arranged.

In another possible implementation, the system may include at least two layers of operation platforms 12 on which the first robot operates, and operation surfaces of the first robot 11 on the different operation platforms 12 are parallel with the ground and vertically arranged.

The goods sorting system further includes an item supply mechanism 21. The item supply mechanism 21 will be described below in detail:

Each layer of the operation platform can correspond to one item supply mechanism. Or, one item supply mechanism corresponds to multiple layers of the operation platforms. Or, one layer of the operation platform is correspondingly provided with at least one item supply mechanism. The item supply mechanism can provide the goods to be sorted for the first robot. Specifically, the item supply mechanism has two manners: automatic supplying and manual supplying. The item supply mechanism includes a goods transferring mechanism. For example, the goods transferring mechanism can include one of a conveyor belt, a mechanical arm, a delivery robot, and the like, and can put the goods to be sorted into the target delivery mechanism of the target first robot. This embodiment of the present disclosure can set a specific structure of a desired goods transferring mechanism according to an application scenario by itself, which will not be limited here.

In one possible implementation, the item supply mechanism 21 can be arranged outside the operation platform 12. In one possible implementation, each delivery mechanism 111 on the first robot 11 corresponds to one delivery container layer 15. In specific implementation, the item supply mechanism 21 can determine the target delivery container layer according to the location information (x, y, z) of the target delivery container sent by the control server 13 and the coordinate point z. Afterwards, in a case that the target delivery container layer is known, the target operation platform can be determined. Therefore, the target first robot on the target operation platform can be determined. In a case that the delivery container layers correspond to the delivery mechanisms, the target delivery mechanism of the target first robot on which the goods to be sorted are going to be delivered can be determined. Or, according to the target delivery container layer where the target delivery container is located and the target operation platform, which are sent by the control server, the target delivery mechanism of the target first robot on which the goods to be sorted are going to be delivered can be determined in a case that it is known that the delivery container layers correspond to the delivery mechanism.

For example, the operation platforms correspond to the delivery container layers. For example, one layer of the operation platform can correspond to a plurality of delivery container layers. As shown in FIG. 1, in a case that there are only two layers of operation platforms on which the first robot operates and each layer of the operation platform is provided with two delivery container layers, one layer of the operation platform corresponds to the two delivery container layers. A value range of z can be 1, 2, 3, or 4, where z=1 may represent a first layer of operation platform and a first delivery container layer; z=2 may represent a first layer of operation platform and a second delivery container layer; z=3 may represent a second layer of operation platform and a third delivery container layer; and z=4 may represent a second layer of operation platform and a fourth delivery container layer. In a case that the delivery container layers correspond to the delivery mechanisms, z=1 can determine a first layer of delivery mechanism of the target first robot corresponding to the first delivery container layer; z=2 can determine a second layer of delivery mechanism of the target first robot corresponding to the second delivery container layer; z=3 can determine the first layer of delivery mechanism of the target first robot corresponding to the third delivery container layer; and z=4 can determine the second layer of delivery mechanism of the target first robot corresponding to the fourth delivery container layer. In a case that the item supply mechanism receives the three-dimensional coordinates (x, y, z), on the sorting map, of the target delivery container corresponding to the goods to be sorted and it is z=4, it can be determined that the target delivery container layer where the target delivery container is located is the fourth delivery container layer, and it is further determined that the target operation platform is the second layer of operation platform and the target delivery mechanism is the second layer of delivery mechanism of the target first robot. Serial numbers of the layers of delivery mechanisms of the first robot are sequenced from low to high, followed by a first layer of delivery mechanism, a second layer of delivery mechanism, . . . , and a nth layer of delivery mechanism, and n is an integer.

In addition, the item supply mechanism 21 is arranged outside the platform, so that the item supply mechanism 21 can also include a hoister. (1) and (2) will explain the configuration of the item supply mechanism in detail below under different operation ranges of the first robot:

(1). In a case that at least one first robot operates on each layer of the operation platform, the hoister can be used to lift the goods to be sorted to the target operation platform and deliver the goods into the target delivery mechanism of the target first robot on the target operation platform. The target delivery mechanism corresponds to the target delivery container layer where the target delivery container is located.

Figure 3:
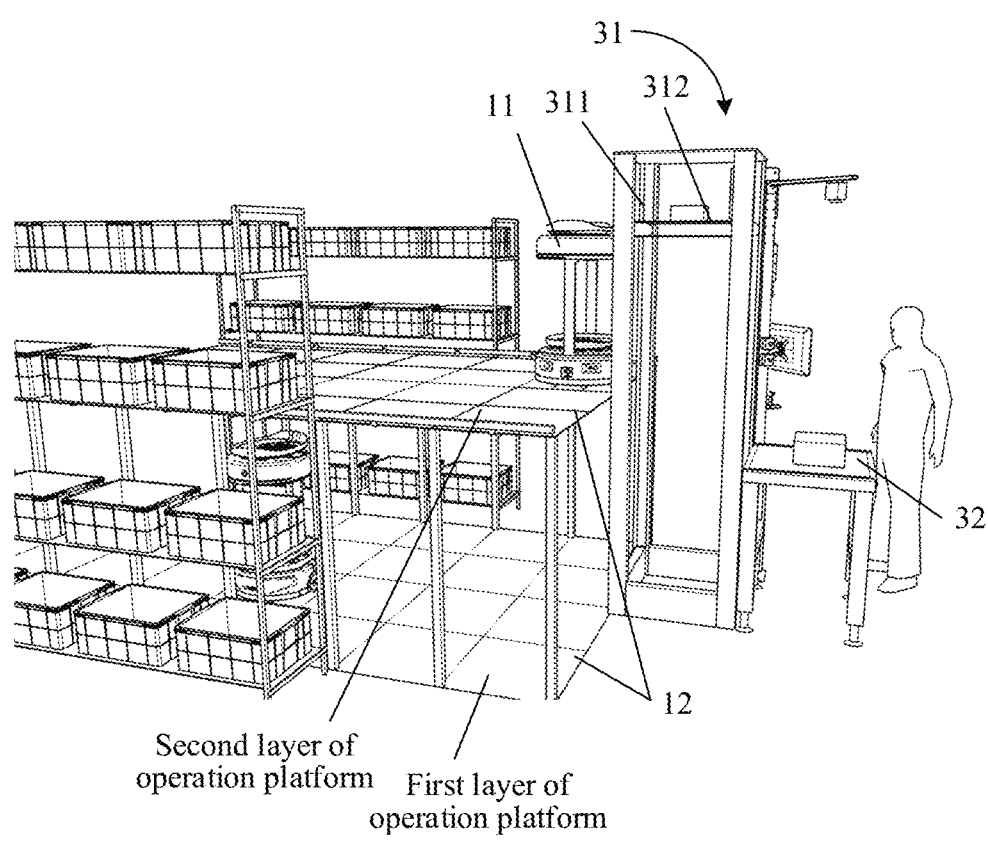
FIG. 3 shows a schematic diagram of transferring goods to be sorted from an item supply mechanism according to an embodiment of the present disclosure.

FIG. 3 shows a schematic diagram of transferring goods to be sorted from an item supply mechanism.

In one embodiment, the hoister 31 may include at least one lifting mechanism 311 and at least one layer of belt conveyor line 312.

Continuing the above example, a worker puts the goods to be sorted on a temporary storage conveyor line 32, and the temporary storage conveyor line 32 is used to transfer the goods to be sorted onto the belt conveyor line 312 of the hoister 31. The hoister 31 can determine, on the basis of the location information (x, y, z) of the target delivery container, the target delivery container layer z where the goods to be sorted are located. At this time, if z=3, it can be determined that the target delivery container layer where the goods to be sorted are located is the first delivery container layer on the second layer of operation platform. When receiving an instruction to lift the goods to be sorted, the hoister 31 determines, according to the target delivery container layer z=3, to lift the goods to be sorted on the belt conveyor line 312 to a height corresponding to the first layer of delivery mechanism of the target first robot on the second layer of operation platform. The belt conveyor line 312 is used to put the goods to be sorted into the first layer of delivery mechanism of the target first robot aligned with a delivery port of the belt conveyor line 312.

In another embodiment, the hoister 31 may include at least one lifting mechanism 311 and at least two layers of the belt conveyor lines 312. Each layer of the belt conveyor line corresponds to one delivery container layer. In specific implementation, the hoister 31 is configured to lift, on the basis of the target delivery container layer where the goods to be sorted are located, the goods to be sorted to the belt conveyor line 312 corresponding to the target delivery container layer. The belt conveyor line 312 is configured to transfer the goods to be sorted on the lifting mechanism 311 to the target delivery mechanism, corresponding to the target delivery container layer, on the target operation platform. The delivery mechanisms of the first robot can be in one-to-one correspondence to the belt conveyor lines.

Continuing the above example, the target delivery container layer z where the goods to be sorted are located can be determined on the basis of the three-dimensional coordinates (x, y, z). At this point, if z=3, it can be determined that the target delivery layer where the goods to be sorted are located is the first delivery container layer on the second layer of operation platform. When receiving an instruction to lift the goods to be sorted, the hoister uses the lifting mechanism to lift the goods to be sorted to the first delivery container layer corresponding to the second layer of operation platform. Each delivery mechanism corresponds to one delivery container layer, and each delivery container layer corresponds to one layer of the belt conveyor line, so that each layer of the belt conveyor line corresponds to one delivery mechanism. The first delivery container layer corresponds to the first layer of delivery mechanism of the first robot, that is, the target delivery container layer z=3 corresponds to the first layer of delivery mechanism of the target first robot, and the belt conveyor line is used to put the goods to be sorted into the first layer of delivery mechanism of the target first robot aligned with a delivery port of the belt conveyor line.

(2). In a case that the first robot operates on the different operation platforms, firstly, the goods transferring mechanism can be used to put the goods to be sorted into the target delivery mechanism of the target first robot on the basis of the target delivery container layer where the target delivery container is located. The target delivery mechanism corresponds to the target delivery container layer where the target delivery container is located. Afterwards, the hoister is used to lift the target first robot onto the target operation platform.

In one possible implementation, each layer of the operation platform 12 is correspondingly provided with at least one item supply mechanism 21.

The item supply mechanism 21 is configured to transfer the goods to be sorted into the target delivery mechanism of the target first robot, where the target first robot is located on the operation platform corresponding to the item supply mechanism.

For example, in a case that at least one robot is arranged on the operation platform, a value range of z can be 1 and 2, where 1 can represent the first delivery container layer arranged on the operation platform, and 2 can represent the second delivery container layer arranged on the operation platform.

A height of the second layer of operation platform from the ground is greater than a height of the first layer of operation platform from the ground. A height of the second delivery container layer from the ground is greater than a height of the first delivery container layer from the ground. Serial numbers of the layers of delivery mechanisms of the first robot are sequenced from low to high.

In one possible implementation, the item supply mechanism 21 may send the information of goods to be sorted to the control server 13. Or, the information can be sent to the control server in other ways of obtaining the information of goods to be sorted. The embodiments of the present disclosure will not limit this.

After the control server 13 dispatches the target first robot to run to the item supply mechanism 21, the control server 13 also needs to determine whether the goods to be sorted are placed on the target first robot. Specifically, the control server can respond to information, fed back by the item supply mechanism 21, that the goods to be sorted have been put into the target delivery mechanism. Or, the control server 13 can respond to information, sent by the target first robot, that the goods to be sorted have been put into at least one delivery mechanism. Afterwards, the control server 13 is used to dispatch the target first robot to place goods onto the target operation platform.

For example, if the item supply mechanism adopts the manual supplying manner, an intelligent display screen is manually operated; button of "Confirm that there are goods on the target first robot" is clicked to send the information to the control server that the goods to be sorted have been put into the target delivery mechanism. For example, if the item supply mechanism adopts the automatic supplying manner, for example, the item supply mechanism can be provided with a visual sensor. In a case that it is detected using the visual sensor that the goods to be sorted have been stored in the target delivery mechanism, the information that the goods to be sorted have been put into the target delivery mechanism can be sent to the control server. For example, each delivery mechanism of the target first robot is provided with a sensor assembly. In a case that at least one sensor assembly detects that the goods to be sorted have been put into the delivery mechanism, the information that the goods to be sorted have been put into the target delivery mechanism is sent to the control server.

Figure 4:
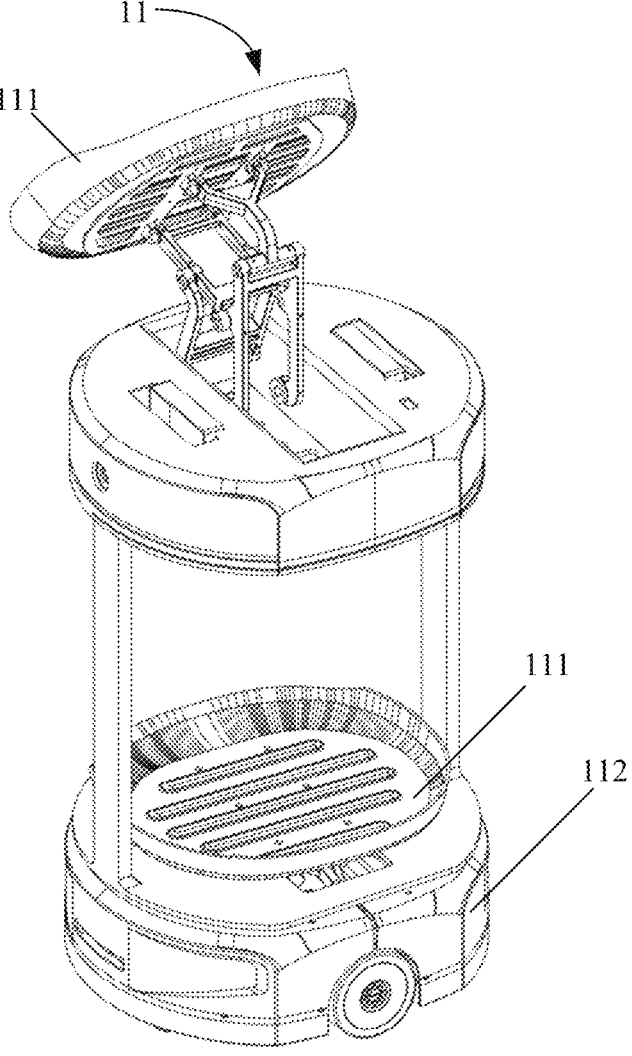
FIG. 4 shows a schematic structural diagram of a first robot according to an embodiment of the present disclosure.

FIG. 4 shows a schematic structural diagram of a first robot. The first robot 11 includes at least two delivery mechanisms 111 and a robot body 112.

The first robot 11 is configured to deliver the goods to be sorted in the target delivery mechanism into the target delivery container.

In one embodiment, each layer of the operation platform can be correspondingly provided with at least one first robot. The target first robot 11 can deliver the goods to be sorted according to a move instruction sent by a control server. Specifically, the move instruction can include information such as a sorting map of a target operation platform where the target first robot is located, location information (x, y, z) of the target delivery container, and path information of movement to a coordinate location (x, y). The target first robot first moves to the coordinate location (x, y) of the target delivery container that receives the goods to be sorted, and the target delivery mechanism is used to deliver the goods to be sorted into the target delivery container on the target delivery container layer corresponding to the target delivery mechanism.

In one embodiment, in a case that the first robot can operate on the different operation platforms, the first robot needs to move across the platforms. The target first robot can run from another operation platform to the target operation platform by using a hoister. A specific delivery process can refer to the description in the above example, and repetitions will be omitted here.

In one embodiment, each delivery mechanism of the first robot is provided with a sensor assembly configured to verify whether the goods to be sorted exist on the delivery mechanism. In response to the move instruction, the first robot 11 is configured to deliver the goods to be sorted into the target delivery container in a case that at least one sensor assembly detects that the goods to be sorted have been put into the delivery mechanism. A specific delivery process can refer to the description in the above example, and repetitions will be omitted here.

In one possible implementation, the at least two delivery mechanisms 111 are vertically arranged on the first robot. A delivery height of each delivery mechanism is greater than a height of a surface, away from the ground, of the delivery container on the corresponding delivery container layer.

In another possible implementation, each delivery mechanism 111 has an adjustable height, so that during delivery of the goods to be sorted, the first robot adjusts the height of the target delivery mechanism to correspond to the height of the target delivery container layer. For example, the delivery mechanisms of the first robot are set to be liftable. During the delivery of the goods to be sorted, the delivery mechanisms are lifted to a height that is greater than the height of the surfaces, away from the ground, of the delivery containers on the delivery container layers, so as to achieve the delivery of the goods to be sorted. The surfaces, away from the ground, of the delivery containers can be a plane where entrances of the delivery containers for receiving the goods to be sorted are located.

For example, each of the delivery mechanisms of the first robot can include a first driving unit and a plate turning mechanism. The first driving unit can drive the plate turning mechanism to a delivery height, and deliver the goods to be sorted placed on the plate turning mechanism into the target delivery container.

For example, each of the delivery mechanisms of the first robot may include a second driving unit and a rolling belt mechanism. The second driving unit can drive the rolling belt mechanism to drive a belt on the rolling belt mechanism to move and deliver the goods to be sorted placed on the belt into the target delivery container.

The delivery height of the delivery mechanism 111 in the above two examples is greater than the height of the surface, away from the ground, of the delivery container on the corresponding delivery container layer.

In one possible implementation, the goods sorting system further includes a second robot 16, which can send goods delivery succeed information to the control server after the target first robot has put the goods to be sorted into the target delivery container. In this case, the control server can determine whether a delivery container is full, and can dispatch the second robot in a case that the delivery container is full. The second robot can replace the full delivery container with an empty delivery container.

The control server stores volume information of each delivery container, volume information of the goods to be sorted, and historical information of the delivery containers that receive goods to be sorted, such as a quantity and volume of the goods to be sorted that have been received. When the control server receives the goods delivery succeed information, it can be determined, on the basis of the historical information of the delivery containers, the volume information of currently received goods to be sorted, and the volume information of the delivery containers, whether a current delivery container is full. When the delivery container is full, the second robot is dispatched to replace the delivery container and send replacement information to the control server after the replacement. The replacement information can include information that the second robot has replaced the full delivery container with an empty delivery container.

For example, the second robot can include at least one container pickup mechanism, at least one temporary storage mechanism, a lifting mechanism, and a portal frame. The container pickup mechanism is arranged on one side of the portal frame, and the temporary storage mechanism is arranged on the other side of the portal frame. The lifting mechanism is arranged on the portal frame to lift the container pickup mechanism to a height corresponding to the full delivery container. The container pickup mechanism is configured to replace the full delivery container with an empty delivery container. The temporary storage mechanism is configured to temporarily store delivery containers (including full delivery containers or empty delivery containers). Specifically, the second robot receives location information of the full delivery container sent by the control server, moves to the location of the full delivery container, controls the container pickup mechanism to pick up and store the full delivery container in the temporary storage mechanism or another temporary storage region such as a sorting conveyor line, and then controls the container pickup mechanism to place an empty delivery container at a free delivery container location.

In one possible implementation, the second robot may include a mechanical arm.

For the above system, working processes of respective application parts of the system will be described in detail below.

Figure 5:
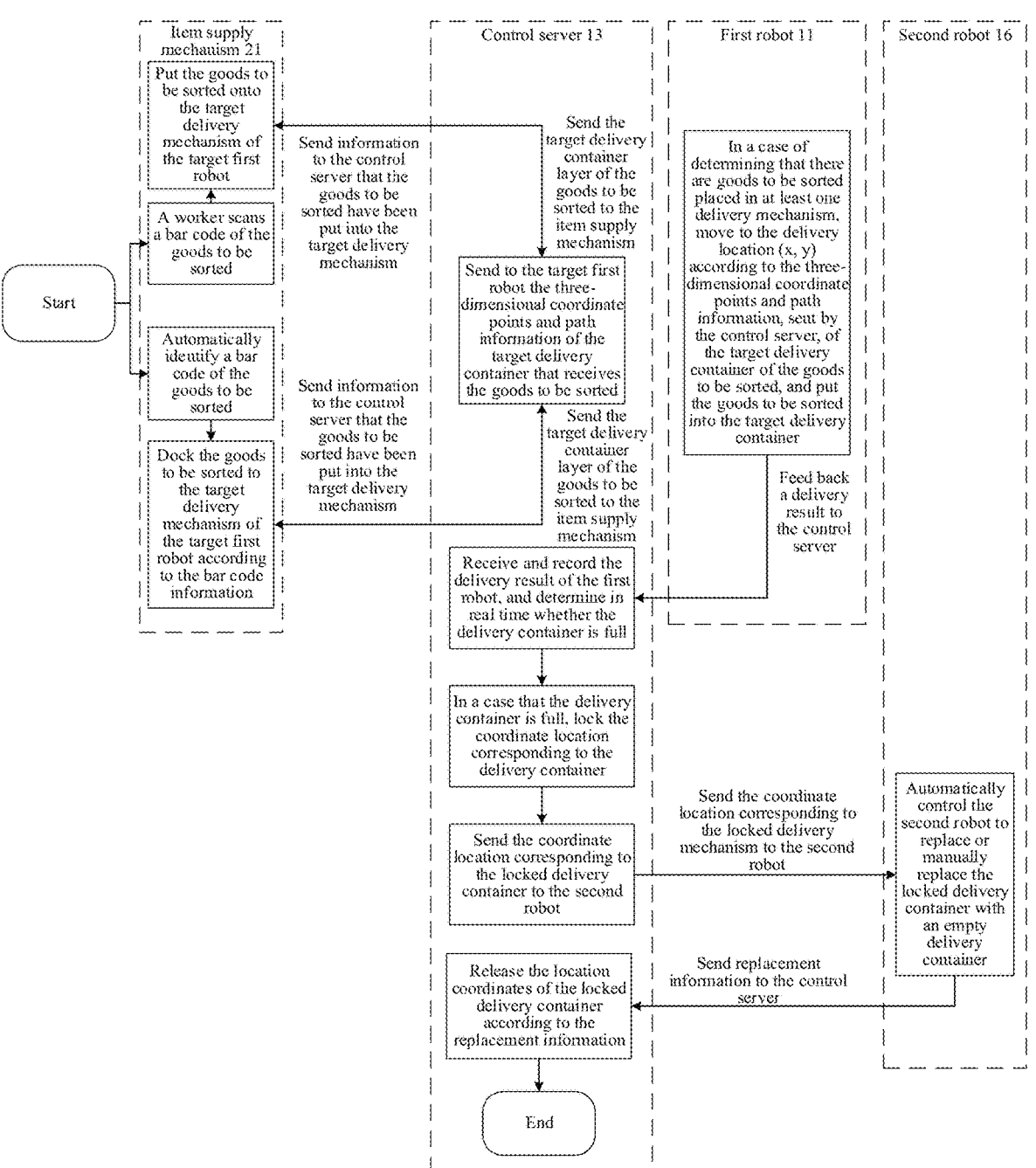
FIG. 5 shows a flowchart of goods sorting of a goods sorting system according to an embodiment of the present disclosure.

FIG. 5 shows a flowcharts of goods sorting of the goods sorting system.

According to the automatic supplying manner, the item supply mechanism 21 automatically identifies a bar code of goods to be sorted, and sends information of goods to be sorted to the control server; and after receiving the target delivery container layer of the goods to be sorted fed back by the control server, the item supply mechanism docks the goods to be sorted to the target delivery mechanism of the target first robot according to the bar code information, and sends information to the control server that the goods to be sorted have been put into the target delivery mechanism. According to the manual supplying manner, a worker scans a bar code of goods to be sorted, and information of goods to be sorted is sent to the control server; and after the target delivery container layer of the goods to be sorted fed back by the control server is received, the goods to be sorted are put onto the target delivery mechanism of the target first robot, and information is sent to the control server that the goods to be sorted have been put into the target delivery mechanism.

The control server 13 sends the target delivery container layer of the goods to be sorted to the item supply mechanism after receiving the information of goods to be sorted; and after receiving the information, sent by the item supply mechanism, that the goods to be sorted have been put into the target delivery mechanism, the control server sends to the target first robot the three-dimensional coordinates and path information of the target delivery container that receives the goods to be sorted.

In a case of determining that there are goods to be sorted placed in at least one delivery mechanism, the first robot 11 moves to the delivery location (x, y) according to the three-dimensional coordinates and path information, sent by the control server, of the target delivery container of the goods to be sorted, puts the goods to be sorted into the target delivery container, and feeds back a delivery result to the control server.

The control server 13 receives and records the delivery result of the first robot, and determines in real time whether the delivery container is full; and in a case that the delivery container is full, locks the coordinate location corresponding to the delivery container. The control server will no longer be able to provide the item supply mechanism with the delivery container layer corresponding to the locked delivery container, and sends the coordinate location corresponding to the locked delivery container to the second robot.

According to the automatic supplying manner, the second robot 16 is controlled to replace the locked delivery container with an empty delivery container. According to the manual supplying manner, the worker manually replaces the locked delivery container with an empty delivery container. After the locked delivery container is replaced with the empty delivery container, replacement information is sent to the control server.

The control server 13 releases the coordinate location of the locked delivery container according to the replacement information.

In summary, the system is provided with at least one layer of the operation platform on which the first robot operates, and each layer of the operation platform is provided with the at least two delivery container layers; and the delivery container layers correspond to the delivery mechanisms. An area of a sorting site for the goods to be sorted can be enlarged, thereby reducing the number of times of sorting and improving the sorting efficiency. Meanwhile, an occupation area of warehousing can be reduced, and the warehousing costs are saved. As the number of layers of the operation platforms increases, the area of the sorting site for the goods to be sorted can be greatly enlarged, which can achieve one-time sorting of the goods to be sorted, namely, which can achieve fine sorting of the goods to be sorted without secondary sorting. In addition, a decrease in the number of times of sorting can effectively reduce the damage rate of the goods to be sorted in a sorting process. In addition, the first robot that transfers the goods to be sorted is provided with at least two delivery mechanisms, which also greatly shortens an average distance of the first robot for delivering the goods to be sorted and further improves the goods sorting efficiency. In addition, under the same occupation area of warehousing, each layer of the operation platform is provided with the at least two delivery container layers, each delivery container layer is provided with at least one delivery container, and the delivery container layers correspond to the delivery mechanisms. The number of delivery containers that receive the goods to be sorted can also be increased by N times (N=M×R, where M represents the number of layers of the operation platforms, and R represents a quantity of the delivery mechanisms), so that the number of times of sorting is further reduced, and the sorting efficiency is improved.

Based on the concept of the above system, the embodiments of the present disclosure further provide a robot. It can be considered that the robot can include the first robot in the above implementation. The structure of the robot can be seen in the structure of the first robot shown in FIG. 3 above. The work tasks performed by the first robot can be seen in the tasks performed by the above first robot. Repetitions will be omitted here.

Based on the concept of the above system, the embodiments of the present disclosure further provide a goods sorting method, applied to the control server in the goods sorting system. The goods sorting system includes at least one layer of the operation platform on which the first robot operates, and at least one first robot; the first robot is provided with at least two delivery mechanisms; each layer of the operation platform is provided with at least two delivery container layers, each delivery container layer is provided with at least one delivery container; the delivery container layers correspond to the delivery mechanisms; and the goods sorting method includes:

determining, on the basis of information of goods to be sorted, the target delivery container corresponding to the goods to be sorted, the target delivery container layer where the target delivery container is located, and the target operation platform; and on the basis of the target delivery container layer where the target delivery container is located and the target operation platform, dispatching one of the first robots as the target first robot, and determining one of the delivery mechanisms in the target first robot as the target delivery mechanism.

In some implementations, the method further includes:

determining whether the delivery container is full; and in a case that the delivery container is full, dispatching the second robot.

In some implementations, the method further includes:

in a case that the delivery container is full, no longer distributing the goods to be sorted to the delivery container.

The embodiments of the present disclosure further provide a computer-readable storage medium, storing computer-readable instructions. The instructions in the storage medium, when executed by a processor, implement the goods sorting method in the above embodiments.

The embodiments of the present disclosure further provide a computer program product. The computer program product includes a computer program code; and the computer program code is run on a computer to perform the goods sorting method in the above embodiments.

The embodiments of the present disclosure further provide a computer program. The computer program includes a computer program code; and the computer program code, when run on a computer, causes the computer to perform the goods sorting method in the above embodiments.

All the embodiments of the present disclosure may be executed individually or in combination with other embodiments and shall fall within the protection scope claimed by the present disclosure.

What is claimed is:

1. A goods sorting system, comprising more than one layer of operation platform, a control server, and more than one first robot operating on the more than one layer of operation platform, and more than one item supply mechanism; wherein the more than one layer of operation platform are directly above and below each other, and each of the more than one layer of operation platform is provided with at least one of the more than one first robot; each first robot is provided with at least two delivery mechanisms; each of the more than one layer of the operation platform is provided with and corresponds to at least two delivery container layers, each delivery container layer is provided with at least one delivery container; the at least two delivery container layers corresponding to each layer of the operation platform respectively correspond to the at least two delivery mechanisms of the at least one first robot provided on the operation platform; and each of the more than one layer of the operation platform is provided with at least one of the more than one item supply mechanism;

the control server is configured to determine a target delivery container corresponding to goods to be sorted and location information of the target delivery container on the basis of information of goods to be sorted, wherein the location information comprises Z-dimensional information, and the Z-dimensional information indicates a target delivery container layer where the target delivery container is located; to determine a target operation platform corresponding to the target delivery container layer on the basis of the Z-dimensional information, and determine and dispatch one of the at least one first robot that is provided on the target operation platform as a target first robot, and to determine one of the at least two delivery mechanisms in the target first robot corresponding to the target delivery container layer as a target delivery mechanism; and to control the target delivery mechanism of the target first robot to obtain the goods to be sorted;

the target first robot is configured to deliver the goods to be sorted in the target delivery mechanism into the target delivery container; and the item supply mechanism corresponding to the target operation platform is configured to transfer the goods to be sorted being outside the operation platform into the target delivery mechanism of the target first robot.

2. The goods sorting system according to claim 1, wherein operation surfaces of the at least one first robot on different operation platforms are parallel with the ground and vertically arranged.

3. The goods sorting system according to claim 1, wherein at least one of the more than one item supply mechanism is arranged outside the operation platform.

4. The goods sorting system according to claim 3, wherein the at least one of the more than one item supply mechanism comprises a hoister; and the hoister is configured to put the goods to be sorted into the target delivery mechanism of the target first robot on the target operation platform.

5. The goods sorting system according to claim 1, wherein the system further comprises at least one second robot;

the control server is further configured to determine whether the at least one delivery container is full; and dispatch the at least one second robot in a case that the at least one delivery container is full; and the at least one second robot is configured to replace the full delivery container with an empty delivery container.

6. The goods sorting system according to claim 5, wherein the control server is further configured to no longer distribute the goods to be sorted to the at least one delivery container in a case that the at least one delivery container is full.

7. The goods sorting system according to claim 1, wherein the more than one layer of operation platform comprises the ground.

8. The goods sorting system according to claim 1, wherein each of the at least two delivery mechanisms is provided with a sensor assembly; and the target first robot is configured to deliver the goods to be sorted into the target delivery container in a case that at least one sensor assembly detects that the goods to be sorted have been put into the target delivery mechanism.

9. The goods sorting system according to claim 1, wherein the at least two delivery mechanisms are vertically arranged on the at least one first robot.

10. The goods sorting system according to claim 1, wherein a delivery height of the target delivery mechanism is greater than a height of a surface, away from the ground, of the target delivery container on the corresponding delivery container layer; or the target delivery mechanism has an adjustable height, so that during delivery of the goods to be sorted, the target first robot adjusts a height of the target delivery mechanism to correspond to a height of the target delivery container layer.

11. The goods sorting system according to claim 1, wherein each of the at least two delivery mechanisms comprises at least one of a plate turning mechanism or a rolling belt mechanism.

12. The goods sorting system according to claim 1, wherein at least one of the more than one item supply mechanism is configured to send the information of goods to be sorted to the control server.

13. A goods sorting system, comprising more than one layer of operation platform, a control server, and more than one first robot operating on the more than one layer of operation platform; wherein the more than one layer of operation platform are directly above and below each other, and each of the more than one layer of operation platform is provided with at least one of the more than one first robot; each first robot is provided with a delivery mechanism; each of the more than one layer of the operation platform is provided with at least one delivery container layer, each delivery container layer is provided with at least one delivery container; the first robot on each layer of the operation platform is configured to deliver goods to be sorted to the delivery container of each delivery container layer; the at least one delivery container layer provided for each layer of the operation platform is arranged outside the operation platform; and the control server stores a sorting map corresponding to each layer of operation platform;

the control server is configured to determine a target delivery container corresponding to the goods to be sorted and location information of the target delivery container on the basis of information of goods to be sorted and the sorting map, wherein the location information comprises Z-dimensional information, and the Z-dimensional information indicates a target operation platform; to determine and dispatch one of the at least one first robot that is provided on the target operation platform as a target first robot based on the Z-dimensional information; and to control the delivery mechanism of the target first robot to obtain the goods to be sorted; and the target first robot is configured to deliver the goods to be sorted in the delivery mechanism into the target delivery container, wherein the system further comprises at least one item supply mechanism, the at least one item supply mechanism is arranged outside the operation platform, the at least one item supply mechanism comprises a hoister, and the hoister is configured to put the goods to be sorted into the delivery mechanism of the target first robot on the target operation platform.

* * * * *